United States Patent

Meeker et al.

[11] Patent Number: 5,574,645
[45] Date of Patent: Nov. 12, 1996

[54] MANIFOLD ABSOLUTE PRESSURE SENSOR EMULATOR

[75] Inventors: Michael B. Meeker, Kenosha; Ross A. Niemi, Burlington, both of Wis.

[73] Assignee: Snap-on Technologies, Inc., Crystal Lake, Ill.

[21] Appl. No.: 395,906

[22] Filed: Feb. 28, 1995

[51] Int. Cl.[6] .................................................. G06F 19/00
[52] U.S. Cl. .............................. 364/431.04; 364/431.03; 364/431.01; 364/424.03; 364/578; 123/412; 123/479
[58] Field of Search .............................. 364/578, 431.04, 364/431.05, 431.07, 431.03, 431.01, 424.03, 431.12; 123/480, 478, 419, 488, 494, 676, 679, 678, 418, 415, 423, 452, 458, 482, 491–493, 497; 73/117.3, 118.2, 119 A; 324/556, 384, 503

[56] References Cited

U.S. PATENT DOCUMENTS

| | | | |
|---|---|---|---|
| 4,224,911 | 9/1980 | Mitsuda et al. | 123/684 |
| 4,231,332 | 11/1980 | Wrathall | 123/416 |
| 4,300,485 | 11/1981 | Goodman | 123/25 J |
| 4,408,582 | 10/1983 | Merrick | 123/415 |
| 4,538,573 | 9/1985 | Merrick | 123/418 |
| 4,583,176 | 4/1986 | Yamato et al. | 364/431.11 |
| 4,586,481 | 5/1986 | Kishida et al. | 123/678 |
| 4,600,993 | 7/1986 | Pauwels et al. | 364/431.05 |
| 4,704,685 | 11/1987 | Martinsons et al. | 364/431.11 |
| 4,757,463 | 7/1988 | Ballou et al. | 364/551 |
| 4,780,826 | 10/1988 | Nakano et al. | 364/431.03 |
| 4,805,576 | 2/1989 | Abe et al. | 123/479 |
| 4,984,988 | 1/1991 | Mizushina et al. | 364/578 |
| 5,001,645 | 3/1991 | Williams et al. | 364/431.04 |
| 5,056,023 | 10/1991 | Abe | 364/424.03 |
| 5,177,447 | 1/1993 | Marino et al. | 364/424.03 |
| 5,214,582 | 5/1993 | Gray | 364/424.03 |
| 5,227,766 | 6/1993 | Endo | 364/424.03 |
| 5,270,935 | 12/1993 | Dudek et al. | 364/431.04 |
| 5,293,553 | 3/1994 | Dudek et al. | 364/431.04 |
| 5,318,449 | 6/1994 | Schoell et al. | 364/431.04 |
| 5,377,112 | 12/1994 | Brown, Jr. et al. | 364/431.12 |
| 5,381,775 | 1/1995 | Birk et al. | 123/679 |
| 5,394,093 | 2/1995 | Cervas | 324/556 |
| 5,404,856 | 4/1995 | Servati | 123/478 |
| 5,408,972 | 4/1995 | Servati | 123/478 |

Primary Examiner—Kevin J. Teska
Assistant Examiner—Jacques Louis-Jacques
Attorney, Agent, or Firm—Emrich & Dithmar

[57] ABSTRACT

A manifold absolute pressure (MAP) sensor emulator is used to emulate the operation of a properly functioning MAP sensor of the type under test. The test involves breaking the pneumatic connection between the vacuum hose from the intake manifold and the MAP sensor input, and breaking the electrical connection between the MAP sensor output and the vehicle on-board computer. The vacuum hose is instead connected to a vacuum probe input of the emulator and the electrical connection to the on-board computer is also connected to the emulator. Thus, the emulator is connected in place of the MAP sensor, and software in the emulator is programmed to provide a voltage or frequency output corresponding to various vacuum levels of a particular MAP sensor. Thus, the emulator can emulate the sensor and, if the engine operates properly in this mode, it indicates that the MAP sensor was bad, and, if not, it indicates that the problem may be elsewhere. The emulator can be programmed to emulate the MAP sensors of different automobiles.

18 Claims, 3 Drawing Sheets

MANIFOLD ABSOLUTE PRESSURE SENSOR EMULATOR

BACKGROUND OF THE INVENTION

1. Field of the Invention

The invention relates to a device for detecting an abnormality in the functioning of a manifold absolute pressure (MAP) sensor on an automobile, and more particularly to a method of this kind which can perform such abnormality determinations by emulating a MAP sensor of the type connected to a microprocessor-based engine control system.

2. Description of the Prior Art

Modern automobiles and similar vehicles include a plurality of engine-mountable sensors which provide signals to an on-board computer having informational value representing engine operating conditions. One such sensor is a manifold absolute pressure (MAP) sensor functioning to provide information relative to the absolute pressure in the intake manifold. As is well known, the amount of intake manifold pressure when coupled with other information, such as engine speed, allows the engine computer to control, among other things, engine fuel requirements.

A microprocessor associated with the vehicle on-board computer reads the pressure signal output from the MAP sensor to control engine operation. For this reason, when the MAP sensor functions improperly, engine performance is adversely affected.

On one end of the MAP sensor is a pneumatic connection between the vacuum hose from the intake manifold and the MAP sensor. On the other end is an electrical connection between the MAP sensor and the vehicle on-board computer.

One obvious way to verify whether a faulty MAP sensor is causing the engine to run rough, involves replacing the vehicle's MAP sensor with an identical off-the-shelf MAP sensor. If engine performance improves with the substituted sensor, the vehicle's present MAP sensor is probably bad. If there is no improvement, the problem lies elsewhere. This test-by-substitution MAP sensor diagnosis is impractical. MAP sensors come in different sizes and shapes, and respond differently to differing levels of input vacuum pressure. Hence, MAP sensors are not interchangeable.

The electrical signal output of a common variety of MAP sensors is a signal whose frequency varies proportional to the vacuum pressure level, measured in inches of Hg (in-Hg), detected at the MAP sensor input. Alternatively, another variety of MAP sensors is voltage varying and generates an output signal, the voltage level of which varies in proportion to a change in the detected vacuum pressure level. Generally, voltage varying MAP sensors are further distinguished between increasing-voltage-variable sensors, which generate an increasing voltage signal proportionate to increases in vacuum pressure, and decreasing-voltage-variable sensors which generate a decreasing voltage signal in response to the increase in vacuum pressure. Typically, both increasing and decreasing voltage-variable type sensors generate an electrical output signal whose voltage levels are positive and typically in the range between +5 and 0 volts. However, it is conceivable that voltage-variable sensors of the type generating negative voltage levels, i.e., 0 to −5 volts may also become common in the future. It would therefore be impractical and inefficient for every automobile technician to have on-hand a wide range of MAP sensors for the purpose of diagnosing a possible single faulty MAP sensor in the vehicle under test. Hence, new diagnostic equipment should include means for testing all types and varieties of MAP sensors.

U.S. Pat. No. 5,214,582 to Gray discloses a general purpose diagnostic work station for use with a vehicle including a network of sensors coupled to an on-board computer. The particular diagnostic work station is described as capable of simulating the operation of a variety of different engine sensors such as, for example, a MAP sensor, independent of the actual operation of such sensor. This is accomplished by way of a network of bypass switches connected between two plug connectors disposed between the on-board computer and the engine sensors. The bypass switches, in turn, are connected to the work station. Depending upon the condition of the bypass switch network, the work station can be connected in parallel with the sensor connectors to monitor the sensor signals, or one or more selected sensors can be disconnected from the on-board computer, and the work station connected in its place. In this latter mode, the work station's internal computer can generate signals to simulate sensor outputs based on operator-entered data representative of the type of sensor under test. That data is then compared to data in a memory-stored look-up table, from which is derived the waveform characteristics of the signal to be simulated. In this arrangement however, because a simulated signal is generated based on predetermined normal sensor outputs, i.e., on a simulated engine input, rather than an actual engine input to the sensor, MAP sensor operation cannot be diagnosed accurately or adequately.

SUMMARY OF THE INVENTION

It is a general object of the present invention to provide a MAP sensor emulator which is economical and easy to construct, as well as easy to use.

It is another object of the present invention to provide a MAP sensor emulator which emulates the operation and function of a properly functioning MAP sensor in response to an actual engine output, allowing the MAP sensor under test to be bypassed.

It is another object of the present invention to provide a MAP sensor emulator capable of emulating a plurality of commercially available MAP sensors.

It is yet another object of the present invention to provide a MAP sensor emulator for testing a wide range of MAP sensors, and which emulator can be readily incorporated as part of a modern-day engine analyzer complete with keyboard, monitor, and the like.

These and other features of the present invention are attained by providing a MAP sensor emulator for use with a vacuum probe adaptably connected to an intake manifold of an engine, which includes a keypad and a keypad decoder for inputting data representative of the MAP sensor to be emulated. A circuit is provided which converts the vacuum pressure output from the vacuum probe to an electrical signal. The electrical signal, in turn, is received by a signal processing circuit which, on the basis of the keyboard-entered data, generates a substitution signal representative of the normal electrical signal response of the emulated MAP sensor. The substitution signal is sent to a test probe which is adaptably connectable to a computer coupled to the engine.

The MAP sensor emulator of the present invention allows an automotive technician to emulate the operation of a properly functioning MAP sensor of the type under test. To do this, the technician first disconnects the sensor output coupled to an on-board computer and replaces the computer connection with a test probe which is coupled to the emulator. The emulator then operates to communicate with the computer in the same manner as would a normally functioning MAP sensor.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENT

Figure 1:
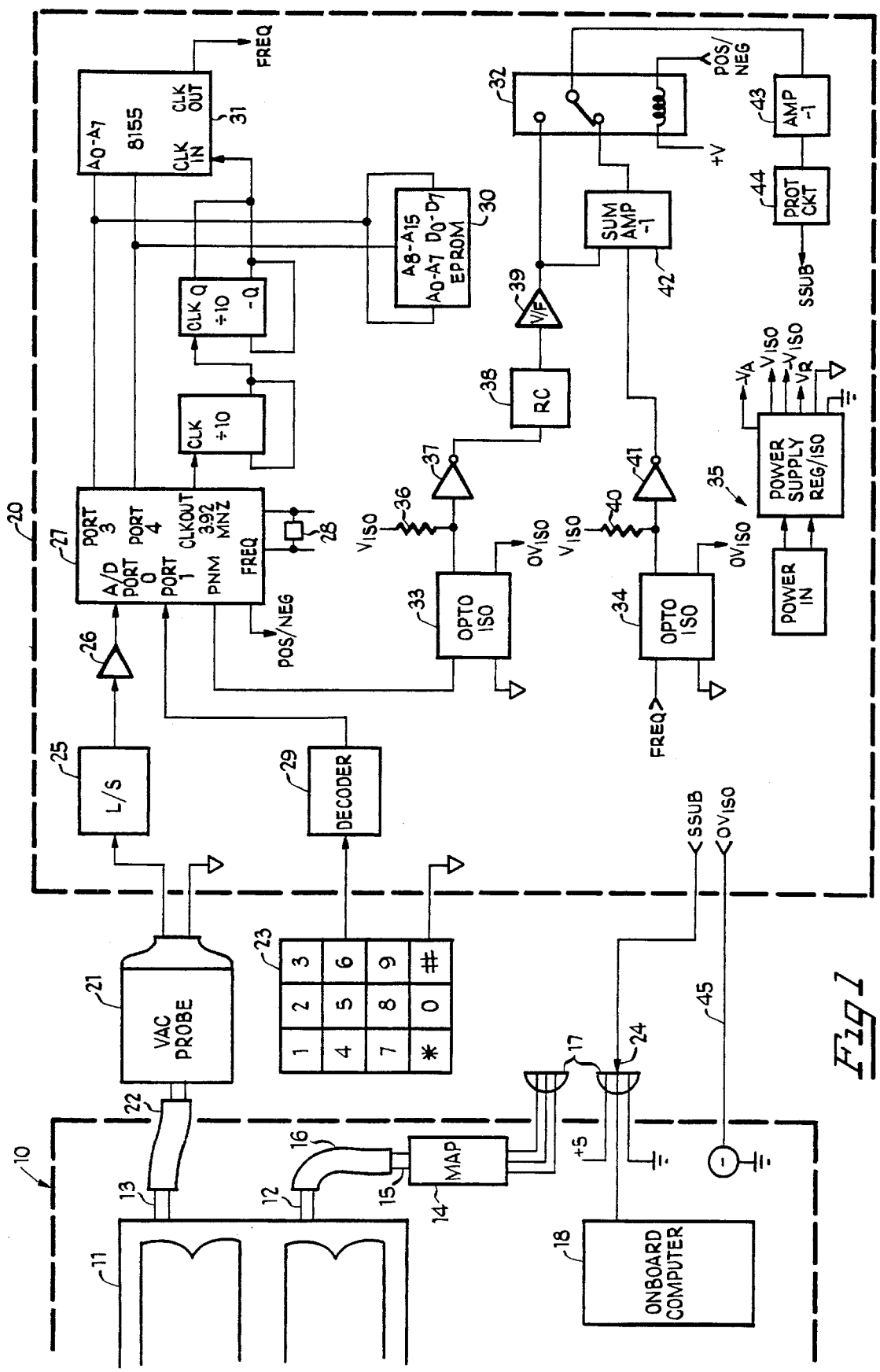
FIG. 1 is a part schematic and part functional block diagram of a MAP sensor emulator, shown in its operating condition coupled to the intake manifold and the on-board computer of an internal combustion engine, and constructed in accordance with and embodying the features of the present invention.

Referring to FIG. 1, there is illustrated a portion of a conventional vehicle engine 10, including an intake manifold 11 (partially shown) having a manifold-to-sensor vacuum pressure output port 12 and a spare vacuum pressure output port 13, and a MAP sensor 14 having an input port 15. Sensor 14 is connected to manifold 11 by a vacuum hose 16 extending between manifold-to-sensor port 12 and sensor input port 15. The MAP sensor 14 is further coupled to a sensor-to-computer connector 17 which allows an electrical signal to be communicated from MAP sensor 14 to an on-board engine computer 18. MAP sensor 14 is a conventional MAP sensor and can be any of three general varieties, including frequency variable sensors, increasing-voltage variable sensors, and decreasing-voltage variable sensors. The MAP sensor output varies in proportion to the vacuum pressure level in the intake manifold 11. The respective ends of sensor-to-computer connector 17 are disconnected to facilitate connecting a MAP sensor emulator 20, which is constructed in accordance with the present invention.

The MAP sensor emulator 20 of FIG. 1 functions to emulate the operation of a normally operating MAP sensor 14 and, to achieve this purpose, is provided with an attachable vacuum probe 21 which generates a DC electrical signal to the emulator 20 which is proportional to the vacuum pressure level flowing into the probe 21 from the manifold 11, via a second vacuum hose 22 coupled to the manifold. In the present constructional embodiment, the vacuum hose 22 is shown coupled to port 13, which is a spare manifold output port provided by the manufacturer for connecting a test probe thereto. When the emulator 20 is coupled to the engine 10 to test the MAP sensor 14, the sensor 14 is electrically bypassed and it makes no difference whether or not it physically remains connected to the manifold. Therefore, in the event a spare port 13 is not available for connection thereto, the vacuum probe 21 may instead be connected directly to the manifold-to-sensor manifold port 12 by disconnecting the vacuum hose 16 therefrom.

A numeric keypad 23 coupled to the emulator 20 is provided for transmitting operator-input commands regarding the sensor 14 to be emulated. Both keypad 23 and vacuum probe 21 are connected to the emulator 20 so as to communicate electrical signals thereto, and is appropriately ground referenced to the regular power supply voltage ground of the emulator 20, described below.

In the preferred embodiment, keypad 23 is of the type generally provided with numeric keys, and including only two non-numeric keys, "*", and "#". It should be appreciated however, that other types of keyboards, such as an alphanumeric keyboard, and other data entry devices or user interfaces, can be used instead without departing from the scope of the invention.

At the emulator 20 output is connected a test probe 24 to which is transmitted signal SSUB, corresponding to the emulated sensor output, to be described in greater detail below. Test probe 24 is physically connected by the automotive technician to an input lead on the computer end of connector 17, which lead normally receives an electrical signal from MAP sensor 14 when sensor 14 is not disconnected for testing. MAP sensor/emulator signals from connector 17 are communicated directly to the on-board computer 18, which processes the signals to control engine operation.

The DC electrical signal from vacuum probe 21 is fed to a level shifter 25 and the analog output therefrom is coupled to a buffer 26. The buffered analog signal is then communicated to an A/D (analog-to-digital) input of a microprocessor circuit (MPU) 27, which input is labelled as port 0.

In the constructional embodiment of the present invention, MPU 27 is an integrated circuit chip of the type generally designated as an 8096 microprocessor, commercially available from Intel. Port 0 of the Intel 8096 microprocessor is provided with an on-chip A/D converter for digitizing analog inputs, and includes circuitry which can generate, under program control, analog outputs by way of an on-chip pulse width modulator (PWM) unit. MPU 27 is further provided with volatile and non-volatile memory registers, as well as with appropriate software routines for processing read signals. MPU 27 is also presettable to generate a fixed-frequency clock signal CLKOUT running off of an internal clock generator, set externally by a frequency reference circuit 28.

Using keypad 23, an operator inputs keypad commands which are ultimately decoded by keypad decoder 29 and communicated to MPU 27. The keypad commands, among other things, identify the output signal characteristics of the MAP sensor 14 about to be emulated. The MPU 27 responds to the decoded commands for programmed operation in either a frequency variable signal mode or increasing/decreasing-voltage variable signal mode. In frequency variable mode, the MPU 27 is initialized to generate a signal SSUB, the frequency of which varies as the vacuum pressure level to the vacuum probe 21 changes, in the same way a frequency variable output MAP sensor would respond to varying vacuum pressure levels.

By contrast, in voltage variable mode, the MPU 27 is initialized to generate a signal SSUB, the waveform of which is different from that in frequency variable mode, in that the SSUB voltage level, rather than signal frequency, varies as the vacuum pressure level to the vacuum probe 21 changes. In this regard, emulator 20 behaves in the same way as would a voltage variable output MAP sensor 14 to changes in vacuum pressure levels.

MPU 27 is coupled to an EPROM 30 and a RAM/timer circuit 31 for communication therewith via a bi-directional, multiplexed address/data bus (A0–A15/D0–D7). RAM/timer 31 is of the type generally designated as an 8155 integrated circuit RAM/timer. RAM/timer 31 is generally operational when the emulated MAP sensor signal (SSUB) to be generated is of the frequency variable type. In this regard, the 8155 is selectively addressable by MPU 27 to generate a signal FREQ, the frequency of which is a function of the frequency of reference clock signal (CLKIN) and of a look-up table value communicated to the 8155 from either the MPU 27 or the EPROM 30, in one of which is stored a look-up table corresponding to the MAP sensor operating parameters over a given range.

The CLKIN signal of RAM/timer 31 is a fixed frequency signal derived from the CLKOUT signal output from MPU 27. Because the CLKOUT frequency (3.92 MHz) is too fast for the RAM/timer 31, two divide-by-10 integrated dividing circuits, connected in series, convert the CLKOUT signal to a 39.2 KHz clock frequency reference signal for input to RAM/timer 31.

The output of RAM/timer 31 is selectively varied in response to an MPU address-selectable look-up table value stored in memory to generate a signal FREQ of some known frequency. When a different look-up table value is communicated to the RAM/timer 31, as may occur when a different vacuum pressure level is detected by the vacuum probe 21, the frequency of signal FREQ will change.

Alternatively, when the MAP sensor 14 to be emulated is of the voltage variable type, generating one of either increasing or decreasing voltage varying signals in response to varying manifold pressure levels, the on-chip PWM unit is programmably selected by the MPU 27, and RAM/timer 31 operation is disabled.

The PWM unit, in response to a look-up table value generated under MPU 27 program control, generates a PWM signal. The PWM signal is characterized by a waveform of non-varying frequency, but with changing duty cycle. The duty cycle is programmably varied as a function of the look-up table value communicated to the PWM unit. Here again, the look-up table value corresponds to manifold pressure level flowing into the vacuum probe 21.

The present constructional embodiment also has provision for generating negative voltage-variable signals for emulating sensors of the increasing and decreasing voltage variable variety whose electrical output is a negative voltage level, for example, in the range between 0 to −5 V. In this regard, depending on whether the increasing/decreasing voltage variable signal is of the positive or negative voltage variety, the MPU 27 will generate a POS/NEG selector signal which controls selection of voltage polarities at the input of a relay 32.

Opto-isolators 33 and 34 are, respectively, coupled to change the regular ground reference of the PWM and FREQ signals to a floating (isolated) ground. The floating ground reference is ultimately commonly connected to the vehicle's circuit ground to create an appropriate closed electrical path. Power supply 35 is used for this purpose, generating both regular and isolated voltage reference signals of appropriate magnitude. Isolated and non-isolated (regular) voltage ground referencing is well known in the art and will not be described in greater detail.

Because the isolated waveform of the PWM signal is not characteristic of the output of a conventional voltage variable MAP sensor, the PWM signal from opto-isolator 33 is fed to a waveform shaper circuit, which includes a pull-up resistor 36, an inverter 37, an RC filter 38, and a voltage follower 39, all connected in sequence. Very similarly, the isolated FREQ output from isolator 34 is coupled to a pull-up resistor 40 and input to an inverter 41. In turn, the FREQ signal from inverter 41 and the PWM signal from voltage follower 39 are coupled, respectively, to first and second inputs of a two-input summing amplifier 42, providing negative unity gain.

Under program control, the relay 32 is programmably selectable by the POS/NEG control signal from MPU 27 to output therefrom: (i) the FREQ signal, from summing amplifier 42, during emulation of a frequency variable output MAP sensor; (ii) the negative polarity (PWM) voltage variable signal, from the amplifier 42, during emulation of a positive voltage variable output MAP sensor; and (iii) the positive polarity (PWM) voltage variable signal, coupled directly from the output of voltage follower 39, during emulation of a negative voltage variable output MAP sensor.

More particularly, in the event the emulator 20 is selected to operate in frequency variable mode, the RAM/timer 31 will cause a signal (FREQ) of an appropriate frequency to be output therefrom. During RAM/timer 31 operation, the PWM output of MPU 27 is disabled so that summing amplifier 42 is otherwise unaffected by a voltage signal from the voltage follower 39. In frequency variable mode, the POS/NEG selection signal is programmably set by MPU 27 to allow relay 32 to pass the signal (FREQ) from the amplifier 42 to a second amplifier 43, which like summing amplifier 42, is a negative unity gain amplifier.

When the emulator 20 is selected to emulate a voltage variable sensor, RAM/timer 31 is disabled and the PWM unit of MPU 27 is activated. The PWM unit generates the voltage variable signal PWM which, after isolation and signal shaping, is commonly coupled to the relay 32 and the summing amplifier 42 to derive both positive and negative polarity signals. MPU 27 controls, via the POS/NEG selection signal, a predetermined one of the two signals (from voltage follower 39 or from summing amplifier 42) to be transmitted to amplifier 43.

The output of amplifier 43 is ultimately coupled to an output protection circuit 44, and from there is input as sensor substitution signal (SSUB) to the on-board computer 18 using the test probe 24. To ensure accurate signal reference levels, signal SSUB is ground referenced to the vehicle's circuit common by way of ground connection 45. Connected in this manner, emulator 20 can simulate any of a number of common varieties of sensor output signals associated with conventional MAP sensors 14.

The MAP sensor emulator 20, while shown in the present constructional embodiment as a standalone unit, is also envisioned as part of a device, such as an engine analyzer, having vacuum probes, test probes, and the like which can be commonly shared, including such common circuitry as addressable memory and the like.

From the foregoing discussion, it should be understood that vacuum probe 21, as connected in FIG. 1, generates a signal to the MPU 27 proportional to the detected vacuum pressure level, which signal, in turn, is interpreted by the emulator 20 and an appropriate variable voltage (or frequency) sensor substitution signal (SSUB) is automatically generated using one of a plurality of look-up tables specifically associated with the MAP sensor under test. It is envisioned, however, that in addition to the automatic generation of SSUB signals, determined on the basis of vacuum probe detected levels of manifold pressure, a technician could also set MPU 27 to operate in 'manual' mode, in which the MPU 27 is set to generate the SSUB signal on the basis of manually input values alone, eliminating the need for a vacuum probe 21.

In this regard, the technician may refer to a manual or the like, providing him with a range of normal expected values for a given engine speed, such as engine idle, for the MAP sensor under test. The technician may then manually enter a value, corresponding to the predetermined look-up values generated automatically under MPU 27 control, to the keypad 23 along with instructions on whether the signal is a FREQ type signal or a PWM type signal, and in the latter case, whether positive or negative. The MPU 27 then communicates the manually derived value to the RAM/timer 31 or to the PWM unit directly, bypassing any table look-up steps associated with automatic emulation.

The manual mode of operation described above is useful when the particular MAP sensor under test is one for which a look-up table is not available in the look-up table memory of the emulator 20. In this regard, a simulated signal (SSUB) is communicated to the on-board computer 18 on the basis of an expected manifold pressure, roughly estimated, for some predetermined engine speed. When a bypassed sensor 14 is malfunctioning, causing an engine to run rough, the manually simulated sensor signal (SSUB) from emulator 20 will likely create enough of a detectable change in engine operation to make diagnosing the sensor 14 possible.

Figure 2:
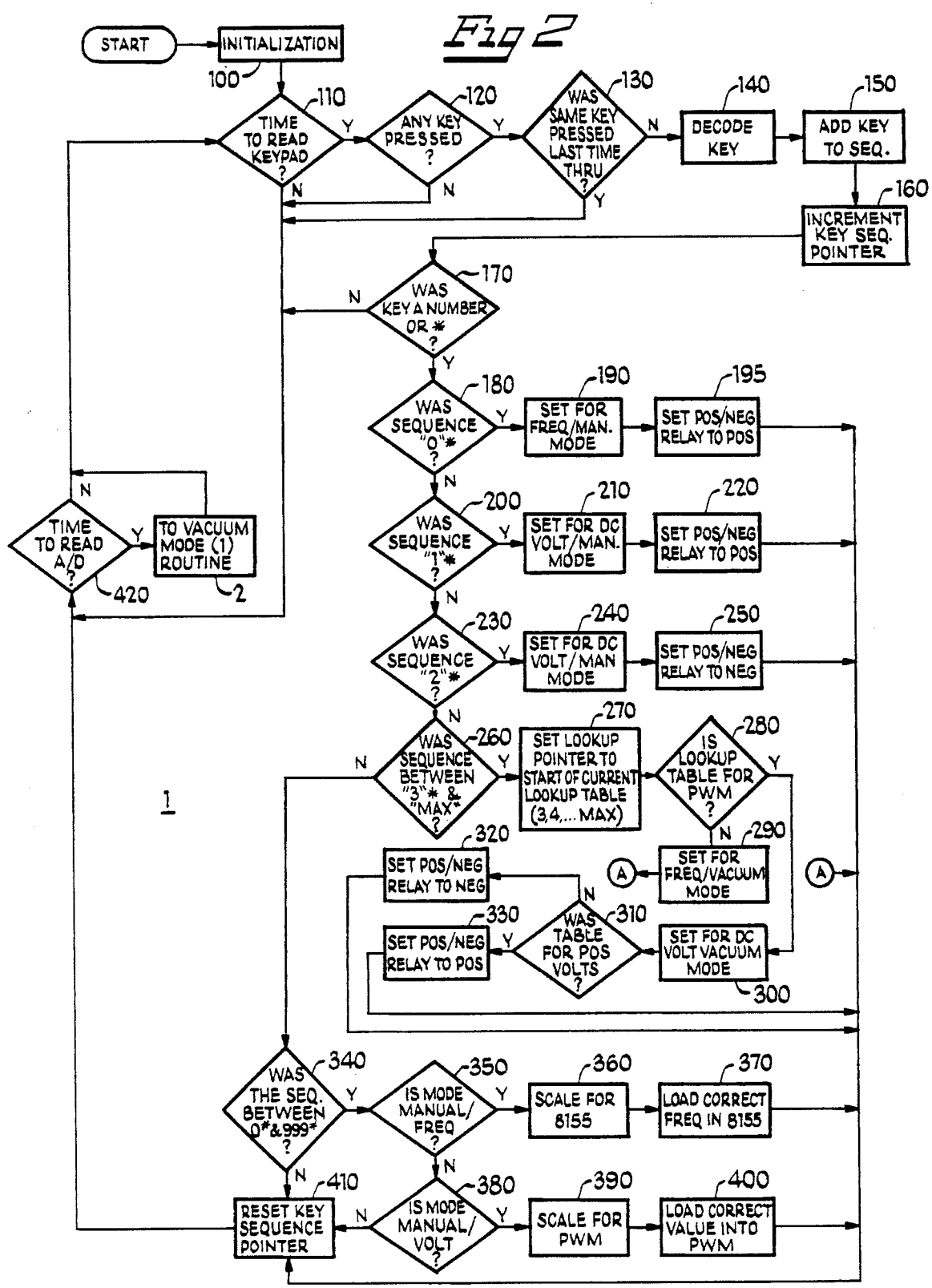
FIG. 2 is an operational flow diagram illustrating the steps for programmably presetting the emulator of FIG. 1 to perform MAP sensor emulation.
Figure 3:
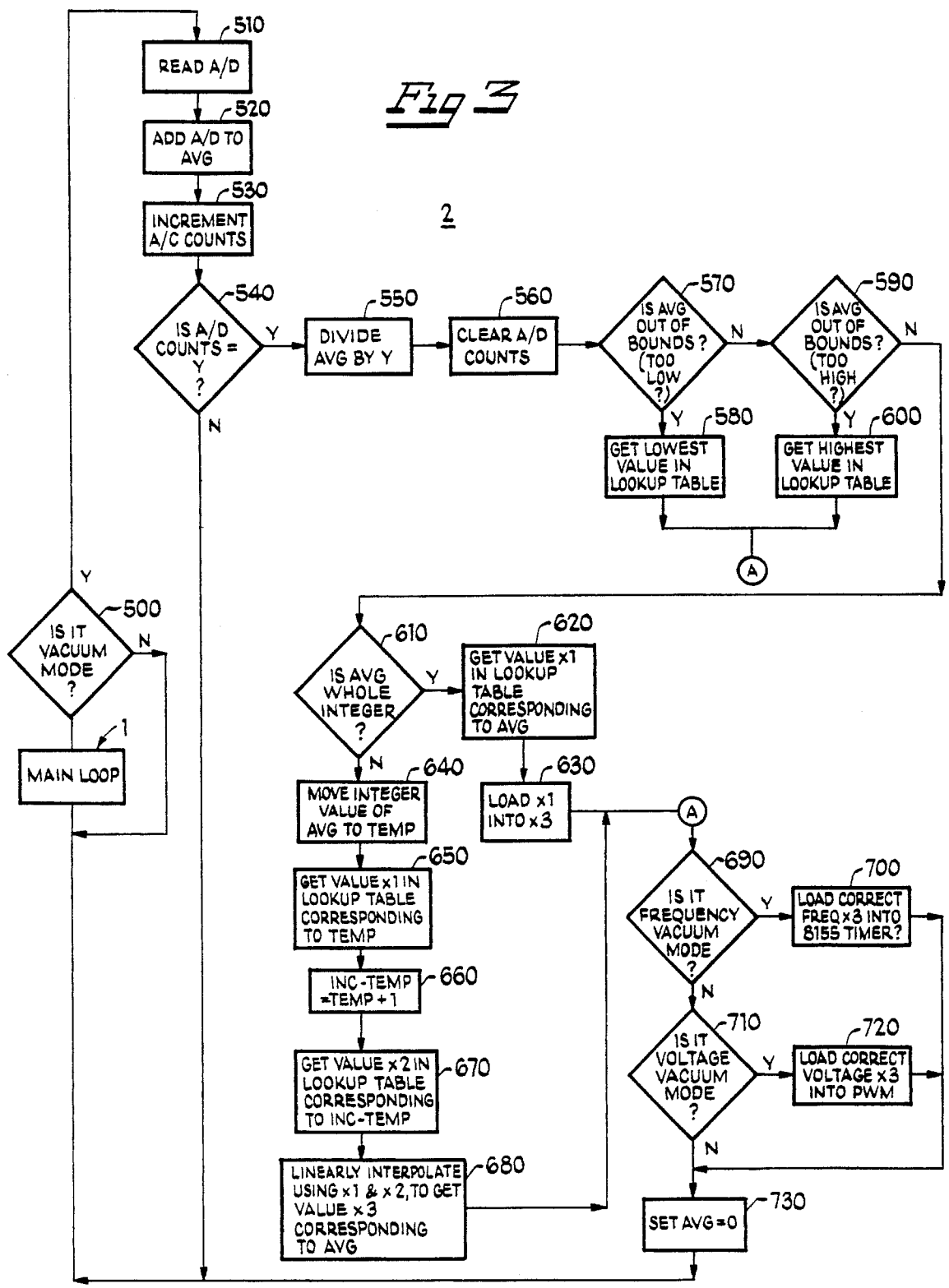
FIG. 3 is a further operational flow diagram illustrating the steps for generating appropriate signals during operation of the emulator of FIG. 1 for MAP sensor emulation.

Referring to FIGS. 2 and 3, there are illustrated flow diagrams of the operational program associated with the emulator 20.

FIG. 2 shows the operational steps for presetting the emulator 20 on the basis of select key sequences, in accordance with a preferred embodiment of the present invention. Prior to an emulator initialization step (block 100), the technician first must be sure to connect emulator 20 as explained above in connection with FIG. 1. As previously explained, emulator 20 can selectively operate in either an automatic (or vacuum) mode or in manual mode. In vacuum mode, the vacuum probe 21 must be coupled in the prescribed manner. In manual mode, the vacuum probe 21 attachment is unnecessary. Furthermore, because the vehicle's engine uses a MAP sensor's electrical signal output to allow the on-board computer 18 to monitor and control engine operations, such as fuel flow, the engine should be off when disconnecting the MAP sensor 14 from the computer 18.

Once the emulator 20 is in position, coupled between the manifold 11 and the on-board computer 18, the emulator can be powered up and a programming sequence initiated. The programming sequence first enters a MAIN LOOP routine, shown generally as 1 in FIG. 2, which checks for keypad strokes, interprets the key pad strokes, and sets the MPU 27 for appropriate emulation control, including performing manual mode operations on the basis of technician input values. When automatic (vacuum) mode is set, the program jumps to a VACUUM MODE routine, shown generally as 2 in FIG. 3, at which time the MPU 27 looks for and reads the A/D signals at its port 0, from vacuum probe 21.

Referring now to FIG. 2, the MPU 27 first checks for keypad strokes corresponding to operator commands (blocks 110–170). The * and # keys are designated special keys indicating the end of a particular key sequence. Each key sequence is examined in the order received, to initialize the MPU 27. A key sequence of "0*" sets MPU 27 for operation in manual mode and also in frequency variable mode (blocks 180–190). A "1*" sequence sets MPU 27 for operation in manual mode and also in positive voltage variable mode (blocks 200–220). Similarly, a "2*" key sequence corresponds to manual and negative voltage variable modes of emulator operation (blocks 230–250). Relay 32 is also set in accordance with the operator instructions for positive/negative selection (blocks 220, 250).

A key sequence between "3*" and "MAX*", inclusive, instructs the MPU 27 to set a look-up pointer at the start of the appropriate corresponding look-up table (blocks 260–270), and sets up the MPU 27 for automatic (vacuum) emulation. By way of example, when the MAP sensor under test is a Ford sensor Model #XYZ, then assuming that there is stored in memory a look-up table having a range of operating values associated with this Ford sensor, and its location is logically identified as "7*", then by keying in the sequence "7*", the technician causes the MPU 27 to set its look-up pointer at the beginning of that memory block.

Each memory-stored look-up table in emulator 20 is uniquely identifiable by the MPU 27 as associated with either a frequency, a positive polarity voltage, or a negative polarity voltage variable type signal. On that basis alone, MPU 27 configures itself for operation in the appropriate mode (blocks 280–330).

In the constructional embodiment, when a look-up table identifier was not previously entered (see block 260) and the MPU 27 was previously set for 'manual' mode operation (as per blocks 190, 210 or 240), then a key sequence between "0#" and "9999#", inclusive (block 340), configures the MPU 27 to disable signal operation at its A/D port 0. This is because, in manual mode, as explained above, an operator input value, namely the value preceding the "#" key, is substituted for the look-up value which is generated automatically in vacuum mode.

The operator input value is then loaded, under MPU 27 control, to either the 8155 RAM/timer 30, or as the input to the PWM circuitry internal to the 8096 MPU 27, to generate the appropriately selected FREQ or PWM signal, which signal is coupled to its respective opto-isolator 33, 34. Once the relay 32 is set for either positive or negative selection, and the PWM (or FREQ) signals communicated to the respective opto-isolator, an appropriate simulated SSUB signal is output, via test probe 24, to the on-board computer 18. If the engine is off, nothing happens. However, if the engine is powered-up, even though the MAP sensor 14 is disconnected from the computer, the simulated output (SSUB) from emulator 20 at the operator selected voltage value (or frequency), fools the car into believing that a MAP sensor is attached. Because the emulator is not responsive to manifold vacuum pressure during manual mode emulation, changes in vacuum pressure have no effect on the simulated SSUB output to the computer. If the engine runs better than it did prior to the test, when the MAP sensor was connected, this is a good indication that the MAP sensor should be replaced. If the engine runs just as poorly, or worse, this is an indication that the problem lies elsewhere, such as possibly, the input circuitry to the on-board computer.

Once the MPU 27 recognizes that all necessary parameters have been input for initializing MPU 27, it resets the keypad sequence pointer (block 410) and checks to see whether the MPU 27 is set for automatic (vacuum) mode emulation (blocks 420, 2). If so, it will jump from the MAIN LOOP routine 1 of FIG. 2 to the VACUUM MODE routine 2 of FIG. 3 (blocks 1, 500) and begin reading consecutive A/D values at port 0, up to a predetermined maximum (y) [blocks 510–540] over a predefined period of engine operation. During this period, a number of sample values are taken to calculate an AVG value (block 550). The AVG value is then evaluated to ensure that the resultant AVG value is within minimum and maximum expected values, as such are defined in the look-up table values corresponding to the sensor under test, and which look-up table was selected by the operator when presetting the emulator 20 (blocks 570–600). The reason for this is that a number of factors could cause manifold pressure to fall outside a normal operating range. When the detected vacuum pressure is too low (or too high), the emulator 20 is programmed to assign a predetermined lowest value (or highest value) as the value for the AVG variable.

When the vacuum pressure input to MPU 27 is within a normal operating range for the particular sensor, the AVG value is compared to a value on the look-up table to determine a corresponding value (x3) which should be sent by the MPU 27 to either the RAM/timer circuitry or to the PWM circuitry to generate the appropriate SSUB signal (blocks 610–640). For example, if the vacuum pressure input signal is a value of 25 in-Hg, the look-up table will provide information on the appropriate FREQ (or PWM) value to be output to emulate a SSUB signal corresponding to that vacuum pressure level.

In the event the look-up table includes only integer values over a given range, MPU 27 can be programmed to linearly interpolate adjacent closest values derived from the look-up table values, to most closely emulate true sensor response (blocks 650–680). For example, if detected vacuum pressure input is 25.3 in-Hg, but the closest-adjacent values on the look-up table consist of whole integers 25.0 and 26.0 (x3), MPU 27 will generate an appropriate linearly interpolated value to the respective SSUB signal generating circuitry (blocks 690–720).

At the end of vacuum mode emulation, program control will jump back to the MAIN LOOP routine 1. Keypad entered instructions generally may be input at any time following system initialization for detection by the MPU 27.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A manifold absolute pressure (MAP) sensor emulator for diagnosing the condition of a MAP sensor by emulating the operation of the MAP sensor when normally functioning, for use with a vacuum probe coupled to an intake manifold of an internal combustion engine and generating electrical signals in response to vacuum pressure at the intake manifold, said emulator comprising:

a user interface for inputting data representative of the MAP sensor to be emulated; and an emulation circuit, responsive to the electrical signals and to the data for automatically generating a sensor substitution signal representative of the normal operating output of the emulated MAP sensor, wherein said emulation circuit includes means for varying a voltage level of the sensor substitution signal proportional to a change in the vacuum pressure sensed by the vacuum probe.

2. The MAP sensor emulator of claim 1, wherein said voltage varying means includes:

table look-up means, responsive to said electrical signals and said keypad data, for generating a voltage indicating value;

a pulse width modulation unit for generating a pulse width modulated signal on the basis of said voltage indicating value; and a waveform shaping circuit for modifying said pulse width modulated signal to generate said sensor substitution signal.

3. The MAP sensor emulator of claim 2, wherein said table look-up means includes means for determining an average value for the electrical signals and means for comparing that average value to a reference value in a table, to derive said voltage indicating value.

4. The MAP sensor emulator of claim 3, wherein said look-up means includes means for deriving the voltage indicating value from a value associated with a predetermined one of the reference values in the table when said average value is outside the range of reference values in the table.

5. The MAP sensor emulator of claim 3, wherein said look-up means includes means for linearly interpolating the voltage indicating value when said average value is between two consecutive reference values in the table.

6. The MAP sensor emulator of claim 1, wherein said emulation circuit includes a microprocessor circuit.

7. The MAP sensor emulator of claim 6, wherein said microprocessor circuit includes an analog-to-digital converter, for digitizing the electrical signals from the vacuum probe.

8. A manifold absolute pressure (MAP) sensor emulator for diagnosing the condition of a MAP sensor by emulating the operation of the MAP sensor when normally functioning, for use with a vacuum probe coupled to an intake manifold of an internal combustion engine and generating electrical signals in response to vacuum pressure at the intake manifold, said emulator comprising:

a user interface for inputting data representative of the MAP sensor to be emulated; and an emulation circuit, responsive to the electrical signals and to the data, for automatically generating a sensor substitution signal representative of the normal operating output of the emulated MAP sensor, wherein said emulation circuit includes means for varying a frequency level of the sensor substitution signal proportional to a change in the vacuum pressure to the vacuum probe.

9. The MAP sensor emulator of claim 8, wherein said frequency varying means includes:

table look-up means, responsive to said electrical signals and said keypad data, for generating a frequency indicating value; and a timer circuit for generating said sensor substitution signal on the basis of said frequency indicating value.

10. The MAP sensor emulator of claim 9, wherein said table look-up means includes means for determining an average value for the electrical signals and means for comparing that value to a reference value in a table to derive said voltage indicating value.

11. The MAP sensor emulator of claim 10, wherein said look-up means includes means for deriving the voltage indicating value from a value associated with a predetermined one of the reference values in the table when said average value is outside the range of reference values in the table.

12. The MAP sensor emulator of claim 10, wherein said look-up means includes means for linearly interpolating the voltage indicating value when said average value is between two consecutive reference values in the table.

13. A manifold absolute pressure (MAP) sensor emulator for diagnosing the condition of a MAP sensor by emulating the operation of the MAP sensor when normally functioning, for use with a vacuum probe coupled to an intake manifold of an internal combustion engine and generating electrical signals in response to vacuum pressure at the intake manifold, said emulator comprising:

a user interface for inputting data representative of the MAP sensor to be emulated; and an emulation circuit, responsive to the electrical signals and to the data, for automatically generating a sensor substitution signal representative of the normal operating output of the emulated MAP sensor, wherein said emulation circuit includes:

signal generating means for selectively varying either a voltage level or a frequency level of the sensor substitution signal in response to a change in the vacuum pressure to the vacuum probe.

14. The MAP sensor emulator of claim 13, wherein said signal generating means includes:

table look-up means, responsive to said electrical signals and said keypad data, for generating a look-up value corresponding to either a voltage indicating value or a frequency indicating value;

a pulse width modulation unit for generating a pulse-width-modulated signal on the basis of said look-up value when said value is the voltage indicating value;

a waveform shaping circuit for modifying said pulse width modulated signal to generate said sensor substitution signal; and a timer circuit for generating said sensor substitution signal on the basis of said look-up value when said value is the frequency indicating value.

15. The MAP sensor emulator of claim 13, wherein said emulation circuit includes positive/negative selector means for selectively outputting the sensor substitution signal as either a positive voltage signal or a negative voltage signal with respect to the electrical signals from said vacuum probe.

16. The MAP sensor emulator of claim 13 wherein said user interface is a keypad for inputting said data, said data including a frequency indicating parameter when the MAP sensor to be emulated is a frequency variable device and a voltage indicating parameter when the MAP sensor to be emulated is a voltage variable device.

17. The MAP sensor emulator of claim 16, wherein said emulation circuit includes a microprocessor.

18. The MAP sensor emulator of claim 16, wherein said emulation circuit includes:

a pulse width modulation unit for generating a pulse-width-modulated signal on the basis of said voltage indicating parameter when said MAP sensor is a voltage variable device;

a waveform shaping circuit for modifying said pulse-width-modulated signal to generate said simulated signal when the MAP sensor to be emulated is a voltage variable device; and a timer circuit for generating said simulated signal on the basis of said frequency indicating parameter when the MAP sensor to be emulated is a frequency variable device.

* * * * *